US009146959B2

(12) United States Patent
Chen et al.

(10) Patent No.: US 9,146,959 B2
(45) Date of Patent: Sep. 29, 2015

(54) DATABASE QUERY IN A SHARE-NOTHING DATABASE ARCHITECTURE

(71) Applicant: International Business Machines Corporation, Armonk, NY (US)

(72) Inventors: Xing Chen, Beijing (CN); Qing Yun Hao, Beijing (CN); Yi Jin, Beijing (CN); Wan Chuan Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/965,393

(22) Filed: Aug. 13, 2013

(65) Prior Publication Data

US 2014/0095470 A1    Apr. 3, 2014

(30) Foreign Application Priority Data

Sep. 29, 2012    (CN) .......................... 2012 1 0375556

(51) Int. Cl.
*G06F 17/30*    (2006.01)
(52) U.S. Cl.
CPC .... *G06F 17/30466* (2013.01); *G06F 17/30433* (2013.01); *G06F 17/30448* (2013.01); *G06F 17/30463* (2013.01)
(58) Field of Classification Search
None
See application file for complete search history.

(56) References Cited

U.S. PATENT DOCUMENTS

| 6,353,818 | B1 * | 3/2002 | Carino, Jr. ............................. 1/1 |
| 7,769,732 | B2 | 8/2010 | Cox et al. |
| 7,774,311 | B2 * | 8/2010 | Cox et al. ...................... 707/636 |
| 8,046,373 | B2 | 10/2011 | Chen et al. |
| 8,266,101 | B1 * | 9/2012 | Shuai ............................. 707/610 |
| 2006/0026116 | A1 * | 2/2006 | Day et al. .......................... 707/1 |
| 2009/0112792 | A1 | 4/2009 | Barsness et al. |
| 2009/0177559 | A1 | 7/2009 | Kim et al. |
| 2010/0017429 | A1 * | 1/2010 | Cox et al. ...................... 707/102 |
| 2010/0049722 | A1 * | 2/2010 | Xu et al. ....................... 707/100 |
| 2011/0270896 | A1 | 11/2011 | Stegelmann |
| 2011/0295907 | A1 | 12/2011 | Hagenbuch et al. |
| 2012/0130963 | A1 | 5/2012 | Luo et al. |
| 2013/0311424 | A1 * | 11/2013 | Bartolome Rodrigo ...... 707/609 |

OTHER PUBLICATIONS

Mehta et al, "Data placement in shared-nothing parallel database system", 1997.*
Rahm et al, "Analysis of Dynamic Load Balancing Strategies for Parallel Shared Nothing Database Systems", 1993.*
Xu et al, "Handling Data Skew in Parellel Joins in Shared-Nothing Systems", 2008.*

(Continued)

*Primary Examiner* — Hung Le
(74) *Attorney, Agent, or Firm* — Cantor Colburn LLP

(57) ABSTRACT

Data query in a share-nothing database includes obtaining a query request and generating an optimized access plan with respect to the query request. The query request relates to external data stored in an external data source and contains a definition for expected distribution of the external data. The data query also includes obtaining data distribution information related to the expected distribution based on the optimized access plan, transmitting the data distribution information to the external data source so that the external data source splits and returns the external data in accordance with the data distribution information, and executing query-related processing of the split external data in accordance with the optimized access plan.

16 Claims, 5 Drawing Sheets

(56) References Cited

OTHER PUBLICATIONS

Yang et al, "Osprey: Implementing MapReduce-Style Fault Tolerance in a Shared-Nothing Distributed Database", 2009.*

Pavlo et al. "A Comparison of Approaches to Large-Scale Data Analysis", SIGMOD '09, Jun. 29-Jul. 2, 2009, Providence, Rhode Island, USA; 14 pages.

* cited by examiner

DATABASE QUERY IN A SHARE-NOTHING DATABASE ARCHITECTURE

PRIORITY

The present application claims priority to Chinese Patent Application No. 201210375556.X, filed Sep. 29, 2012, and all the benefits accruing therefrom under 35 U.S.C. §119, the contents of which in its entirety are herein incorporated by reference.

BACKGROUND

The present invention relates to database query, and more specifically, to a method and apparatus for data query in a share-nothing database.

A database is used to organize, store and manage data in accordance with data structure. With the development of information technology, there is an increasing number of data to be stored and processed, which puts forward higher requirements for a database. To adapt for storage and management of mass data, composition of a database is expanded from a simple single storage to a cluster of a plurality of storages. Moreover, a database may also be combined with an external data source to provide storage, management and query of data collectively, so as to further expand the application of a database.

An external data source can be implemented through a variety of data storage systems including centralized data storage systems and distributed storage systems. Examples of distributed storage systems include Network File System (NFS), Hadoop File System (HDFS), and so on. Many external data sources do not support a standard application programming interface (API) to access data, and thus it usually needs a user defined function (UDF) to perform external data query, so as to fetch data from an external data source into a database.

FIG. 1 illustrates a schematic view of data query in a system with a database combined with an external data source. In FIG. 1, a Hadoop system is used as an example of the external data source. In order to perform data query in such a system, firstly, the user side issues a structured query language (SQL) query request to a database management engine. The code of the query request may be as shown on the right side. It can be seen from the right-side code that in order to fetch data from the Hadoop system, two UDFs are included in the query request, i.e., jaqlSumit and hdfsRead, to request and fetch data from the Hadoop system. The code segment of the middle part in the SQL query request is used for data query in the Hadoop. For such a query request, the database management engine first compiles and analyzes the code in the request. Specifically, for a UDF in the query request, the database engine opens a separate thread to run the UDF. Therefore, the program and thread running the UDF are also usually referred to as a UDF entity. In the example of FIG. 1, the database management engine then creates two UDF entities which read data from the external data source Hadoop system, respectively. Finally, the database management engine organizes the read data and returns them to a user interface.

On the other hand, as described above, the database may be composed of a cluster of a plurality of storage devices. Such a cluster may have many modes of sharing, for example, memory sharing in which CPUs of multiple devices share the same piece of memory and communicate with one another through an internal communication mechanism, disk sharing in which each CPU uses its own private memory area but accesses all disk systems directly through an internal communication mechanism, and share-nothing in which each device's CPU has a private memory area and a private disk space, and different CPUs cannot access the same disk space and may communicate with one another through a network connection. In the above modes of sharing, the non-sharing manner is a typical architecture commonly used by a database. For a database with a share-nothing architecture, if it is combined with an external data source to perform data storage and query, a problem of data redistribution may arise.

FIG. 2 illustrates a schematic view of data query in a system with a share-nothing database combined with an external data source. As shown in FIG. 2, the database is composed of a plurality of share-nothing devices, each having a separate CPU, memory, and disk for storing data. Typically, each device is also referred to as a node of the database, whereby the database of FIG. 2 contains share-nothing nodes N1-N4. In such a share-nothing database, in order to read data from the external data source, usually, a UDF entity is created at each node, and the created multiple UDF entities are used to execute external data reading in parallel. However, since the database does not recognize the distribution of data in the external data source and the external data source can not know the desired data distribution, after a database management engine fetches data from the external data source through UDFs, these data are required to be redistributed. By way of example, suppose it is desired to query information about a user and his recent transaction, wherein information related to the user is stored in a database local device while the transaction information is stored in the external data source. In such a case, the database management engine needs to fetch the transaction information from the external data source, and then join this transaction information with the corresponding user information. Since nodes of the database share nothing, the database engine needs to send respective transaction information to a particular node storing the corresponding user information before the joining. For example, assuming that user A's information is stored in the node N1 while the UDF entity on the node N2 obtains the user A's transaction information, the database engine needs to send the data obtained by the UDF entity on N2 to N1, so as to enable the joining of user A with his transaction information. It can be appreciated that, for a database with share-nothing architecture, communication between nodes can reduce the system performance significantly.

SUMMARY

In view of the above, the present disclosure is proposed to provide a solution that is able to reduce or avoid the redistribution of data in a share-nothing database in a query process.

In accordance with one embodiment of the present invention, there is provided a method for data query in a share-nothing database. The method includes obtaining a query request and generating an optimized access plan with respect to the query request. The query request relates to external data stored in an external data source, and the query request further contains a definition for expected distribution of the external data. The method also includes obtaining data distribution information related to the expected distribution of the external data based on the optimized access plan, transmitting the data distribution information to the external data source so that the external data source splits the external data in accordance with the data distribution information and returns the split external data in parallel, and executing query-related processing on the split external data in accordance with the optimized access plan.

In accordance with another aspect of the present invention, there is provided an apparatus for data query in a share-nothing database. The apparatus includes an access plan generation unit configured to obtain a query request and generate an optimized access plan with respect to the query request. The query request relates to external data stored in an external data source, and the query request further contains a definition for expected distribution of the external data. The apparatus also includes a data distribution information obtaining unit configured to obtain data distribution information related to the expected distribution of the external data based on the optimized access plan, a data distribution information transmission unit configured to transmit the data distribution information to the external data source so that the external data source splits the external data in accordance with the data distribution information and returns the split external data in parallel, and a query processing execution unit configured to execute query-related processing on the split external data in accordance with the optimized access plan.

The method and apparatus in accordance with the present disclosure allow defining the expected distribution of the external data and make the external data source split and return the external data in accordance with this expected distribution, thereby avoiding data access across nodes during data query and improving the efficiency of the data query.

BRIEF DESCRIPTION OF THE SEVERAL VIEWS OF THE DRAWINGS

Through the more detailed description of some embodiments of the present disclosure in the accompanying drawings, the above and other features and advantages of the present disclosure will become more apparent, wherein the same reference generally refers to the same components in the embodiments of the present disclosure.

DETAILED DESCRIPTION

Figure 1:
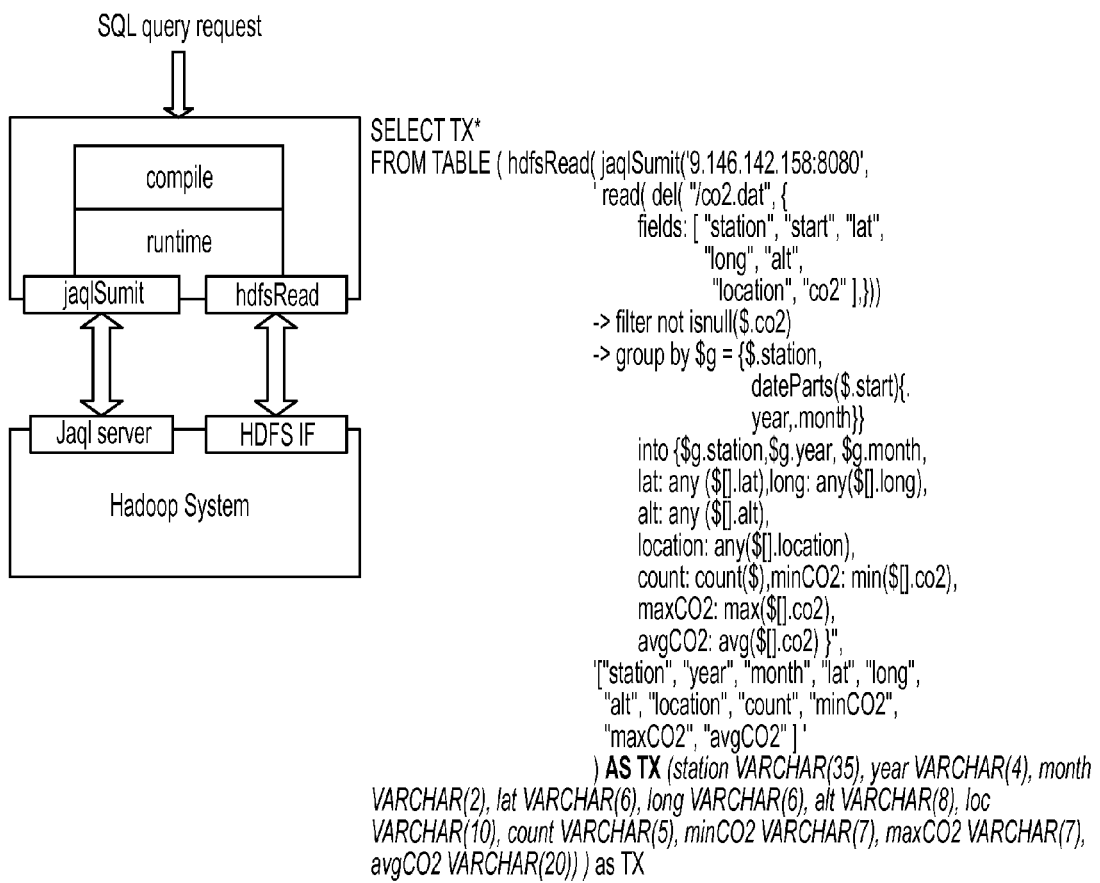
FIG. 1 illustrates a schematic view of data query in a system with a database combined with an external data source.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, these embodiments are provided for the thorough and complete understanding of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be sent using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products in accordance with embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
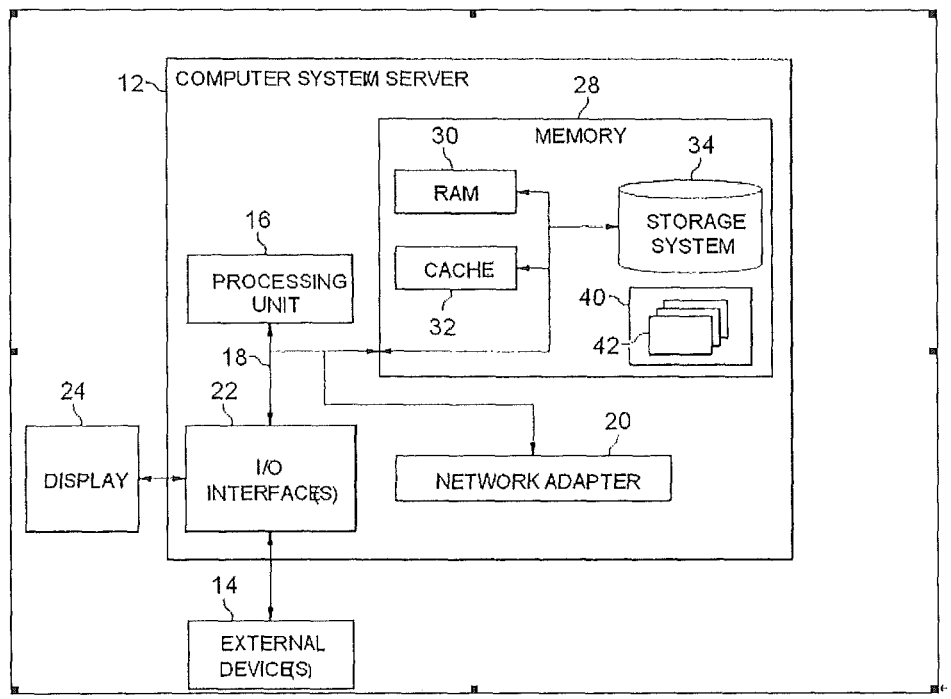
FIG. 3 illustrates a block diagram of an exemplary computer system/server 12 adapted to be used to implement the mode for carrying out the embodiments of the invention.

Referring now to FIG. 3, an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 3, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The idea and implementation of the present invention are described below with reference to specific embodiments. In accordance with an embodiment of the present invention, in order to prevent a share-nothing database from redistributing data when executing a data query process, it is allowed to define in a query request the expected distribution of data to be fetched from an external data source, and a UDF entity created by a database engine can obtain the expected data distribution from an access plan generated with respect to the query request. Then, the UDF entity can send the corresponding data distribution information to the external data source, and instruct the external data source to split and return the queried data in accordance with the data distribution information. So, the data returned from the external data source has the expected data distribution, and then can be directly joined with the data in the database, without need for re-distribution.

Figure 4:
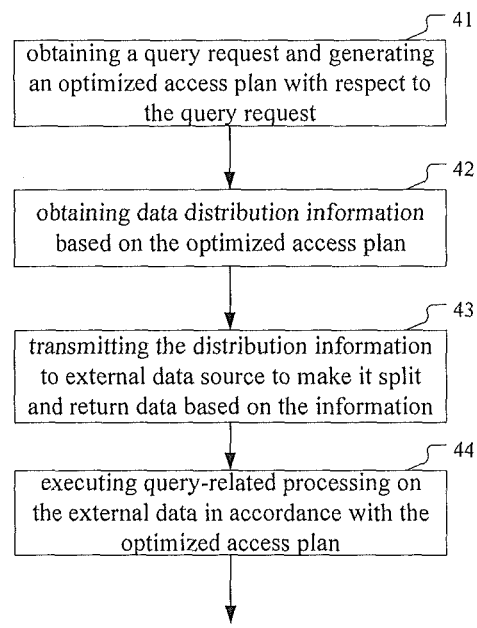
FIG. 4 illustrates a flowchart of a method for data query in accordance with one embodiment of the present invention.

Referring now to FIG. 4, there is shown a data query method in accordance with an embodiment of the present invention. As shown in FIG. 4, the data query method of this embodiment comprises the following: block 41 of obtaining a query request and generating an optimized access plan with respect to the query request, wherein the query request relates to external data stored in an external data source, and the query request further contains a definition for expected distribution of the external data; block 42 of obtaining data distribution information related to the expected distribution of the external data based on the optimized access plan; block 43 of transmitting the data distribution information to the external data source so that the external data source splits the external data in accordance with the data distribution information and returns the split external data in parallel; and block 44 of executing query-related processing on the split external data in accordance with the optimized access plan. The way of executing the steps hereinabove is described below in combination with specific examples.

First, in block 41, a query request is obtained in a share-nothing database, the query request relating to external data stored in an external data source. In order to fetch external data from the external data source, the query request contains the corresponding UDF. Moreover, in order to avoid the redistribution of the external data in the database, the embodiment of the present invention allows defining the expected distribution of the external data in the query request.

Typically, the query quest further relates to internal data stored in the share-nothing database, and contains an association condition for defining association relationship between the internal data and external data. In the case of querying the internal data and external data in association, generally, the defined expected distribution of the external data is related to the association condition between the internal data and external data.

The SQL code of an exemplary query request is illustrated below.

```
select
    max(high_price),min(low_price),stock_id
from
    t1,
    table(pget('/home/username/udf/file'))
        as t2(stock char(10),pn integer)
        SPLIT BY (stock) AS TABLE t1
    where
        t1.stock_id=t2.stock and (t1.pn=1 or t1.pn=0)
    group by
        stock_id
```

In the above exemplary query request, t1 is local data stored on a share-nothing database node, i.e. the internal data described hereinabove. Clause table(pget('/home/username/udf/file')) as t2 ( . . . ) contains a UDF, i.e., pget('/home/username/udf/file'). This UDF is used to read data from a specific location of the external data source. In accordance with the definition of the above clause, data read from the external data source through the UDF are organized as a table t2. Thus, t2 is formed by data stored in the external data source, corresponding to the external data above. Next, clause t1.stock_id=t2.stock and (t1.pn=1 or t1.pn=0) defines an association condition of t1 and t2. Furthermore, in accordance with the embodiment of the present invention, it is allowed to contain the definition for the expected distribution of the external data in the query request, i.e. clause SPLIT BY (stock) AS TABLE t1. Specifically, this clause defines the expected distribution of the external data t2, i.e., data of t2 is expected to be split in accordance with stock in the same way as the distribution of t1. It can be seen that the defined expected distribution is related to the association condition between t1 and t2.

It can be understood that the SQL code described herein above is just a specific example of the query request. The form and content of the query request are not limited to this specific example shown. In other embodiments, the query request may be implemented using other languages and code forms. Accordingly, the definition of the expected distribution of the external data may also be identified using other keywords.

In one embodiment, the query request relates only to the external data; in the example above as shown by the code, the query request relates to the external data and internal data. In other examples, the query request may further relate to more data (e.g., more tables t3, t4 and the like in addition to the above tables t1, t2), and define more complex association conditions (e.g., t3 and t4 collectively being associated with t2 while t2 being associated with t1, and so on). In this case, the definition for the expected distribution of the external data may possibly be more complex accordingly. However, as to a possibly more complex query request and distribution definition, the execution process thereof is similar to the above example. The specific execution will be described below.

After obtaining the query request as described above, the database engine compiles and analyzes the query request, and then generates an access plan. As known to those skilled in the art, the database engine includes a compiler and an optimizer, wherein the compiler compiles and parses the code of the query request, while the optimizer generates an access plan adapted for the query request based on the parsed data structure. The access plan defines the specific execution way and execution path of the query, for example, in what order to access tables, which indexes to use, and what method to join data, and so on. Specifically, the compiler first executes compiling and grammar parsing for the query request, and outputs a data structure in the form of a logic tree. Each node in the logic tree represents an operation in the query, such as reading a certain table, executing inner join, etc. Based on such a data structure, the optimizer executes optimization processing. Generally, the optimizer first converts logical operations on the tree structure to physical operations, thereby generating a preliminary access plan. Then, the optimizer estimates the execution cost of each access plan, resulting in an optimized access plan.

For the aforementioned query request, in addition to the above processing of existing technologies, the compiler and optimizer further performing processing related to the data distribution definition. Specifically, the aforementioned query request contains the definition on the expected distribution of the external data. Accordingly, the compiler needs to recognize the definition of the expected distribution when compiling the query request, and contain it in the tree form data structure. Thus, the expected data distribution defined in the query request is contained in the preliminary access plan. Further, in the optimization phase, the optimizer optimizes the access plan by considering this data distribution, thereby generating an optimized access plan. In general, the expected distribution of the external data defined in the query request is intended to reduce or avoid data access across nodes in query process. More specifically, in the case where query request relates to both internal data and external data, the defined expected distribution of the external data is related to the association condition of the external data and internal data, and is intended to facilitate the co-located JOIN of data. The co-located JOIN refers to JOIN of data realizable without communication between the nodes in the database. Generally, in the case where data to be joined are located in the same node in the database, the co-located JOIN can be directly performed for the data. Therefore, considering the data distribution defined in the query request, the optimizer chooses an execution path of the co-located JOIN as the optimized access plan.

The above execution process is described below in combination with the above exemplary query code. As mentioned earlier, the query request contains a clause SPLIT BY (stock) AS TABLE t1 to define the expected data distribution. After compiling and parsing the clause, the database engine is informed that data of the table t2 fetched from the external data source through UDF will be split. Specifically, data fetched through the UDF entity pget ( ) executed in parallel will be partitioned based on column (stock) of the table. The partitioning rule is the same as table t1. Based on such data distribution definition, the optimizer generates an optimized access plan, which specifies co-located JOIN between columns of t1 and t2.

In the case where the query request relates only to the external data, the optimizer executes optimization based on the execution cost of each candidate path and considering the defined expected data distribution, so as to generate the optimized access plan. The optimized access plan can reduce or avoid data access across nodes in the query process.

After the optimized access plan is generated, the database engine begins to execute the query request in accordance with the access plan. In the process of executing the query request, the database engine opens and creates UDF entities for fetching the external data from the external data source. By modifying UDF, the UDF entities are made to obtain the data distribution information related to the expected distribution of the external data based on the executed access plan, that is, to execute the block 42 of FIG. 4.

In one embodiment, a UDF entity obtains information in the access plan that is being executed by calling an extended interface function in runtime, thereby obtaining the above data distribution information. The data distribution information is used to reflect the expected data distribution defined in the query request.

For the above example of the exemplary query code, the definition for the data distribution of t2 , i.e., t2 being split in accordance with the column based on the column distribution of t1, may be embodied in the optimized access plan. In particular, the UDF entity can obtain the name of table t1 by calling the extended API function String getSplitBaseTableName ( ), and obtain the index of the column of table t2 by calling int[ ] get SplitBaseColIndices( ). Based on information returned by the calling, the UDF entity obtains data distribution information related to t2 . It can be appreciated that for a different data distribution definition contained in the query request, UDF entity may call a different specific interface function. For example, in another example, the query request relates only to the external data, and defines to split the external data in accordance with the setting of a certain configuration file. In this case, the UDF entity needs to call other functions to obtain information of the configuration file, such as the access path, name and content of the configuration file and so on.

After obtaining the data distribution information, in block 43, the UDF entity transmits the data distribution information to the external data source so that the external database splits the external data in accordance with the data distribution information, and returns the split external data in parallel. It can be appreciated that in the prior art, the UDF entity acts as an interface with the external data source created by the database engine for communication with the external data source. In order to obtain the external data stored in the external data source, the UDF entity issues to the external data source a query instruction in which information of the external data is contained. Accordingly, the external data source prepares the external data according to the received query instruction. On this basis, in block 43, the UDF entity further contains data distribution information of the external data in the query instruction, and instructs the external data source to split and return the external data in accordance with the transmitted data distribution information. Then, the external data source prepares the external data under the direction of the UDF entity, splits the external data in accordance with the data distribution information, and returns the split external data in accordance with the data distribution information to a plurality of UDF entities in parallel as well.

In one embodiment, the data distribution information transmitted by the UDF entity to the external data source contains a direct splitting rule and a returning rule. For instance, in one example, the data distribution information specifies that the table formed by the external data shall be split in accordance with column, and data of the i-th column shall be returned to UDFi on the i-th node of the database. For such data distribution information, the external data source, under the direction of the UDF entity, may split the external data in accordance with the splitting rule, and return the split external data to the UDFs specified by the returning rule in parallel, respectively.

In another embodiment, the data distribution information transmitted by the UDF entity to the external data source relates to index information pointing to other data. In this case, the external data source needs to first obtain contents of the other data in accordance with the index information before determining the target distribution of the external data. For instance, in the example of the above exemplary code, the UDF entity contains the name of the table t1 in the data distribution information, and instructs the external data source to split and return data of the table t2 in accordance with the column distribution of the table t1. Thus, the external data source needs to access the share-nothing database on the contrary and obtain the distribution of the table t1 in accordance with the index information of t1 (e.g., name), and then it can determine how to distribute the table t2 . In one example, the column distribution of the table t1 is determined through a hash function. That is, assumed that data in the ith column of t1 is stored on the j-th node in the share-nothing database, then j can be determined by hashing i. In such a case, the external data source further needs to obtain the hash function to determine the column distribution of the table t1 as the target distribution of the table t2 . Further, the external data source can return data in respective columns of the split t2 to UDFs of different nodes in accordance with the target distribution of the t2.

In one embodiment, the UDF entity may first process the obtained data distribution information relating to the index information so that it contains the direct splitting rule and returning rule, and then transmits the processed data distribution information to the external data source. For instance, for the above example shown by the exemplary codes containing t1 and t2 , the UDF entity may perform hash operation on the column of the table t1 to obtain the storage location of each column, and contain the correspondence relationship between column and its storage location as a direct returning rule in the data distribution information to send to the external data source, so that the external data source may directly split and return the external data based on the data distribution information.

It can be appreciated that the data distribution information may further have other forms and contain more contents. However, in any specific form, the data distribution information is intended to make the external data source to be informed of the target distribution state of the external data, and split and return the external data in accordance with the target distribution state. Then, the UDF entities running on respective nodes in the database may obtain the returned external data from the external data source in parallel, respectively. Further, each UDF entity may deliver the obtained external data to the database engine. Based on the obtained external data, the database engine can perform processing related to the data query in accordance with the optimized access path, i.e., to execute the block 44.

As mentioned earlier, the database engine has generated the optimized access path with respect to the query request.

The optimized access plan takes the expected distribution of the external data into consideration, and thus may reduce or avoid data access across nodes in the query process. On the other hand, the external data source has obtained from the UDF entity the data distribution information reflecting the expected data distribution, and thus split and returned the external data. Therefore, the actual distribution of the external data returned from the external data source is consistent with the expected distribution defined in the query request, and also is in compliance with the expectations of the optimized access plan. Therefore, in the block 44, the database engine may execute query-related processing with respect to the obtained external data in accordance with the optimized access plan previously generated, without need for delivering the external data across different nodes. In the case where the query request relates to the external data and internal data, the optimized access plan chooses an execution path which facilitates co-located JOIN of the internal data and external data. In such case, the query-related processing performed in the block 44 comprises executing co-located JOIN of the internal data and external data in accordance with the association condition in the query request. In one embodiment, the above query-related processing further comprises other conventional processing such as organizing and presenting the queried data.

Figure 5:
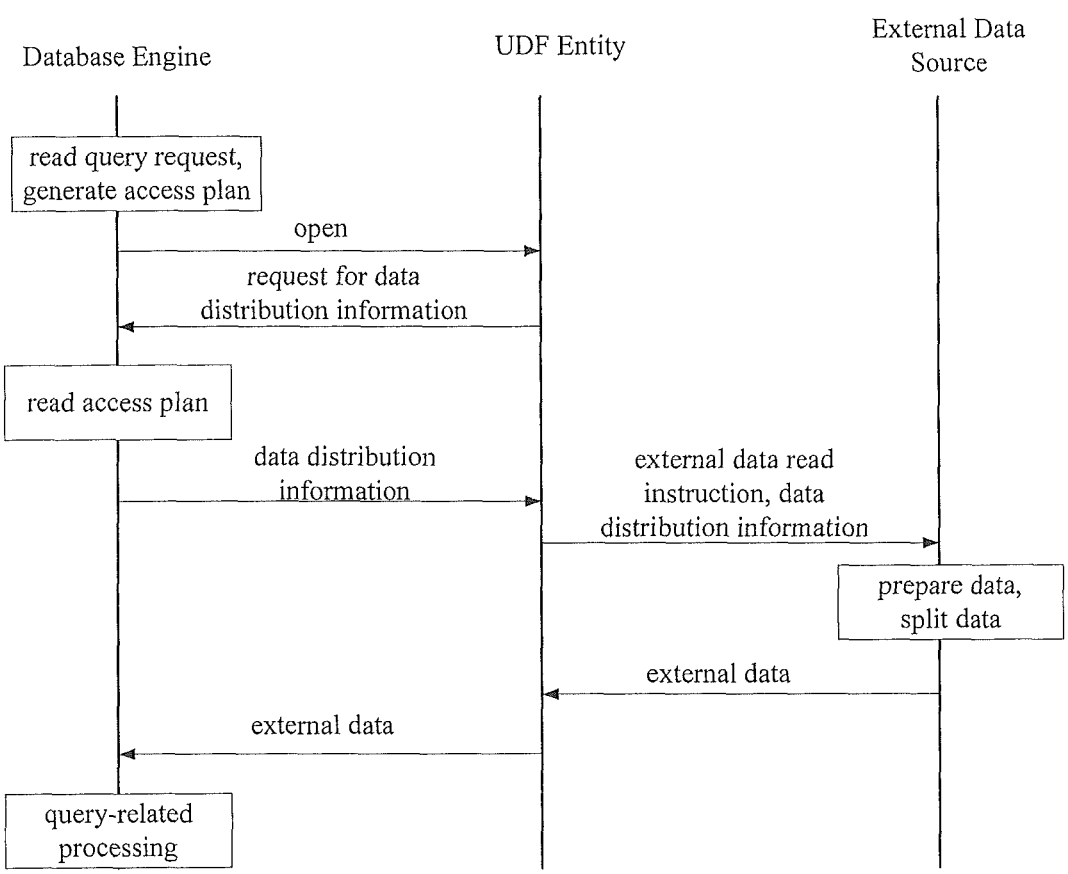
FIG. 5 illustrates operation sequences of various entities involved in the data query in an embodiment of the present invention.

FIG. 5 illustrates operation sequences of various entities involved in the data query in an embodiment of the present invention, and this operation sequences diagram describes the data querying method of FIG. 4 from another point of view. As shown in FIG. 5, first, the database engine receives a query request, and generates an optimized access plan based on the query request. Then, when executing the access plan, the database engine opens or creates a UDF entity. The UDF entity requests the database engine for the data distribution information by calling an interface function provided by runtime. Accordingly, the database engine returns the requested data distribution information to the UDF entity by reading information of the access plan. Then, the UDF entity transmits an external data reading instruction to the external data source, and attaches the data distribution information to it. This makes the external data source prepare data according to instructions of the UDF, and split and return the external data in accordance with the data distribution information. Thus, the UDF entity obtains the split external data returned from the external data source. Next, the UDF entity sends the obtained external data back to the database engine, whereby the database engine executes the query-related processing with respect to the obtained data.

Figure 2:
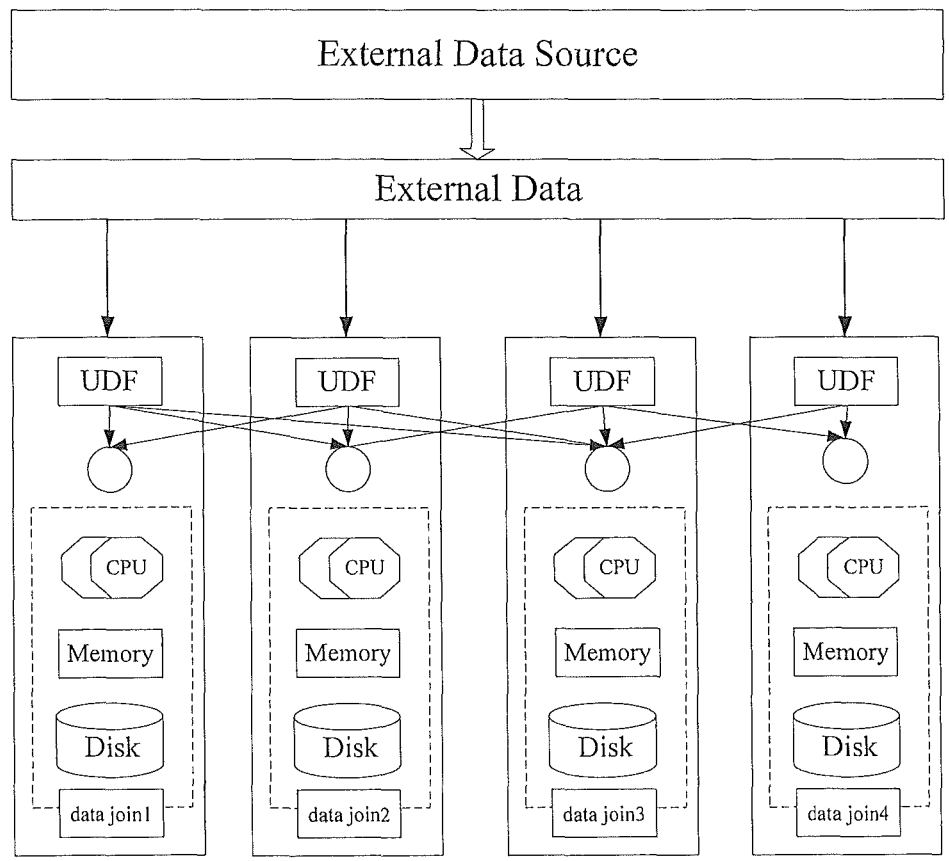
FIG. 2 illustrates a schematic view of data query in a system with a share-nothing database combined with an external data source.
Figure 6:
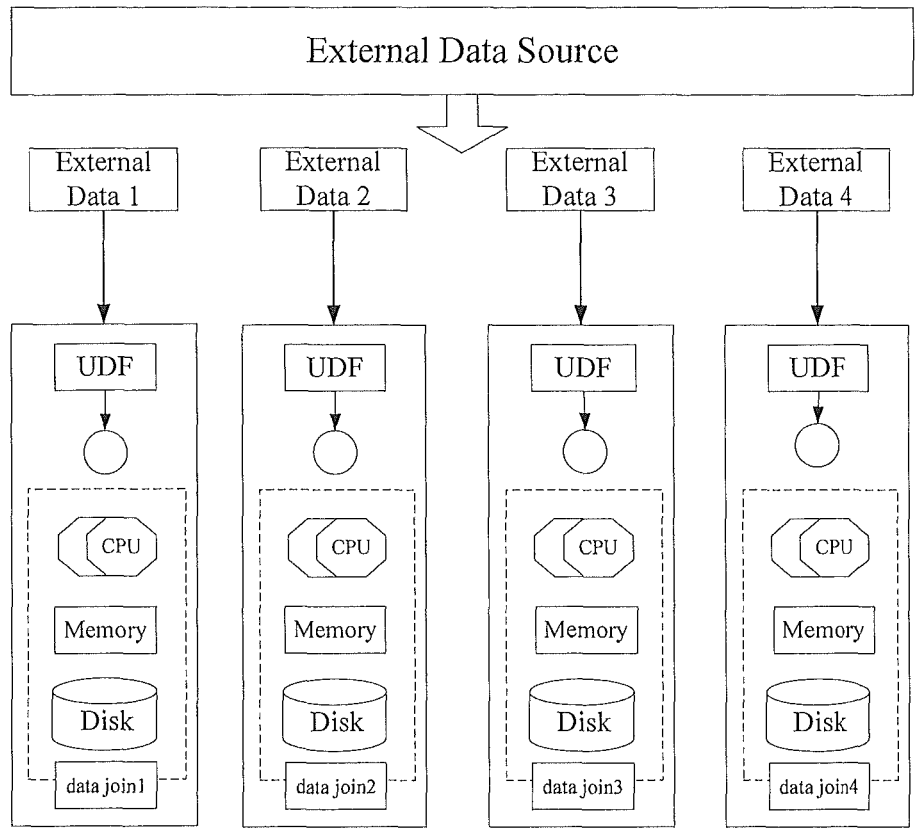
FIG. 6 illustrates a schematic diagram showing the effect of the execution of the method of FIGS. 4 and 5.

FIG. 6 illustrates a diagram showing the effect of the execution of the method of FIGS. 4 and 5. The structure of the database shown in FIG. 6 is the same as that in FIG. 2, both are formed by multiple share-nothing nodes, and in order to read data from the external data source, a UDF entity is created at each node. The difference is that, through the method of the embodiment of the present invention, the UDF entity obtains the data distribution information from the database engine to reflect the expected distribution of the external data defined in the query request. The expected distribution is intended to reduce or avoid data access across database nodes, that is, free of data delivery and redistribution between nodes. Further, the UDF entity transmits such data distribution information to the external data source, making it aware of the expected data distribution. Then, the external data source pre-splits the external data in accordance with the data distribution information under the direction of the UDF entity, and returns the split external data to each UDF entity in parallel. So, the external data returned from the external data source has an expected data distribution. For the external data with such expected distribution, each UDF entity only needs to return the obtained part of external data to the database engine and then the query processing of data (including the joining with the internal data) can be executed within the node, without needing to redistribute the external data across nodes as shown in FIG. 2.

It can be appreciated that in the share-nothing database structure, the UDF entities on respective nodes can work in parallel. In one embodiment, each UDF entity transmits the data distribution information to the external data source. In another embodiment, a part of the UDF entities is chosen to execute the transmission of the data distribution information. For instance, in one example, a specific UDF entity (for example, a UDF entity running on a specific internal node) is chosen constantly to transmit the data distribution information to the external data source; in another example, the UDF entity that firstly establishes a connection with the external data source is used to transmit the data distribution information. Those skilled in the art may also use other means to determine the UDF entity for transmitting the data distribution information, as long as the external data source can obtain the data distribution information through one or more of the UDF entities.

It can be appreciated from the above description that, in the embodiments of the present invention, it is allowed to define the expected distribution of the external data in the query request, the expected distribution being intended to reduce or eliminate data access across nodes in the data query. Further, the data distribution information reflecting the expected distribution is transmitted through the UDF entity to the external data source, so that the external data source may pre-split the external data in accordance with the data distribution information. Then, data returned from the external data source has the expected distribution. Therefore, based on the expected distribution, the query processing of data does not relate to data access across nodes, thereby avoiding the redistribution of the external data between database nodes.

Figure 7:
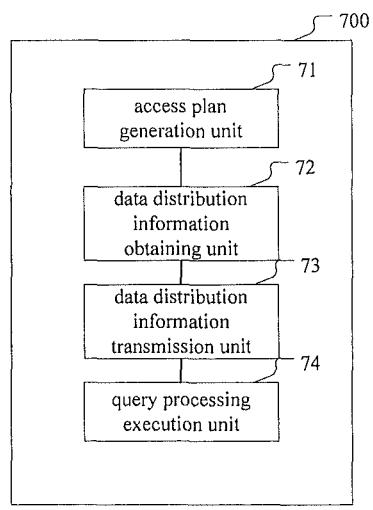
FIG. 7 illustrates a block diagram of a data query apparatus in accordance with an embodiment of the present invention.

Based on the same inventive idea, an embodiment of the present invention further provides an apparatus for data query. FIG. 7 illustrates a block diagram of a data query apparatus in accordance with an embodiment of the present invention. As shown in FIG. 7, the data query apparatus is denoted by 700 as a whole. Specifically, the apparatus 700 includes: an access plan generation unit 71 configured to obtain a query request and generate an optimized access plan with respect to the query request, wherein the query request relates to external data stored in an external data source, and the query request further contains a definition for expected distribution of the external data; a data distribution information obtaining unit 72 configured to obtain data distribution information related to the expected distribution of the external data based on the optimized access plan; a data distribution information transmission unit 73 configured to transmit the data distribution information to the external data source so that the external data source splits the external data in accordance with the data distribution information and returns the split external data in parallel; and a query processing execution unit 74 configured to execute query-related processing on the split external data in accordance with the optimized access plan.

In one embodiment, the query request further relates to internal data stored in the share-nothing database, and includes an association condition between the internal data and external data; the expected distribution of the external data is associated with the association condition.

In one embodiment, the access plan generation unit 71 is configured to recognize the definition for the expected distribution of the external data, and contain it in the preliminary access plan, and optimize the preliminary access plan considering the expected distribution to obtain the optimized access plan.

In one embodiment, the data distribution information obtaining unit 72 is configured to obtain information of the optimized access plan by calling an extended interface function in the runtime, and obtain the data distribution information based on the obtained information of the optimized access plan.

In one embodiment, the data distribution information transmitted to the external data source contains a direct splitting rule and returning rule, so that the external data source splits the external data in accordance with the splitting rule and returns the split external data in accordance with the returning rule.

In one embodiment, the data distribution information transmitted to the external data source relates to index information pointing to other data, so that the external data source first obtains contents of the other data based on the index information, accordingly determines the target distribution of the external data, and then splits and returns the external data based on the target distribution of the external data.

In one embodiment, the data distribution information obtained by the data distribution information obtaining unit 72 relates to index information pointing to other data, and the data distribution information transmission unit 73 is configured to process the data distribution information so that it contains a direct splitting rule and returning rule, and then transmit the processed data distribution information to the external data source.

In one embodiment, the query processing execution unit 74 is configured to execute co-located JOIN of the internal data and the split external data.

In one embodiment, the above-mentioned access plan generation unit 71 and the query processing execution unit 74 are included in the database engine, or implemented by the database engine; the data distribution information obtaining unit 72 and the data distribution information transmission unit 73 are included in a UDF entity or implemented through a UDF entity.

In one embodiment, the apparatus 700 is integrated or embedded in the existing database management system. In another embodiment, the apparatus 700 communicates with the database management system as a separate apparatus.

With the method and apparatus of embodiments of the present invention, data access across nodes in the data query is avoided by defining the expected distribution of the external data, thereby increasing the efficiency of data query.

The flowchart and block diagrams in the Figures illustrate the architecture, functionality, and operation of possible implementations of systems, methods and computer program products in accordance with various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data query in a share-nothing database, comprising:

obtaining, by a computer processor, a query request and generating an optimized access plan with respect to the query request, wherein the query request relates to external data stored in an external data source, and the query request further contains a definition for expected distribution of the external data;

obtaining data distribution information related to the expected distribution of the external data based on the optimized access plan;

transmitting the data distribution information to the external data source so that the external data source splits the external data in accordance with the data distribution information and returns the split external data in parallel; and executing query-related processing on the split external data in accordance with the optimized access plan.

2. The method according to claim 1, wherein the query request further relates to internal data stored in the share-nothing database, and comprises an association condition of the external data and internal data, wherein the expected distribution of the external data is associated with the association condition.

3. The method according to claim 2, wherein the executing query-related processing on the external data comprises: executing co-located JOIN on the internal data and the split external data, the co-located JOIN referring to JOIN within a same node in the share-nothing database.

4. The method according to claim 1, wherein the generating an optimized access plan with respect to the query request comprises:

recognizing the definition for the expected distribution of the external data, and including it in a preliminary access plan; and optimizing the preliminary access plan considering the expected distribution to obtain the optimized access plan.

5. The method according to claim 1, wherein the obtaining the data distribution information comprises: obtaining information of the optimized access plan by calling an extended interface function in runtime, and obtaining the data distribution information based on the obtained information of the optimized access plan.

6. The method according to claim 5, wherein the data distribution information comprises a direct splitting rule and returning rule, so that the external data source splits the external data in accordance with the splitting rule and returns the split external data in accordance with the returning rule.

7. The method according to claim 5, wherein the data distribution information relates to index information pointing to other data, so that the external data source first obtains contents of the other data in accordance with the index information, accordingly determines a target distribution of the external data, and then splits and returns the external data based on the target distribution of the external data.

8. The method according to claim 5, wherein the data distribution information relates to index information pointing to other data, and the transmitting the data distribution information to the external data source comprises firstly processing the data distribution information so that it contains a direct splitting rule and returning rule, and then transmitting the processed data distribution information to the external data source.

9. An apparatus for data query in a share-nothing database, comprising:
    an access plan generation unit configured to obtain a query request and generate an optimized access plan with respect to the query request, wherein the query request relates to external data stored in an external data source, and the query request further contains a definition for expected distribution of the external data;
    a data distribution information obtaining unit configured to obtain data distribution information related to the expected distribution of the external data based on the optimized access plan;
    a data distribution information transmission unit configured to transmit the data distribution information to the external data source so that the external data source splits the external data in accordance with the data distribution information and returns the split external data in parallel; and
    a query processing execution unit configured to execute query-related processing on the split external data in accordance with the optimized access plan.

10. The apparatus according to claim 9, wherein the query request further relates to internal data stored in the share-nothing database, and comprises an association condition of the external data and internal data, wherein the expected distribution of the external data is associated with the association condition.

11. The apparatus according to claim 10, wherein the query processing execution unit is configured to execute co-located JOIN on the internal data and the split external data, the co-located JOIN referring to JOIN within a same node in the share-nothing database.

12. The apparatus according to claim 9, wherein the access plan generation unit is configured to:
    recognize the definition for the expected distribution of the external data, and include it in a preliminary access plan; and
    optimize the preliminary access plan considering the expected distribution to obtain the optimized access plan.

13. The apparatus according to claim 9, wherein the data distribution information obtaining unit is configured to: obtain information of the optimized access plan by calling an extended interface function in runtime, and obtain the data distribution information based on the obtained information of the optimized access plan.

14. The apparatus according to claim 13, wherein the data distribution information comprises a direct splitting rule and returning rule, so that the external data source splits the external data in accordance with the splitting rule and returns the split external data in accordance with the returning rule.

15. The apparatus according to claim 13, wherein the data distribution information relates to index information pointing to other data, so that the external data source first obtains contents of the other data in accordance with the index information, accordingly determines a target distribution of the external data, and then splits and returns the external data based on the target distribution of the external data.

16. The apparatus according to claim 13, wherein the data distribution information obtained by the data distribution information obtaining unit relates to index information pointing to other data, and the data distribution information transmission unit is configured to firstly process the data distribution information so that it contains a direct splitting rule and returning rule, and then transmit the processed data distribution information to the external data source.

* * * * *